United States Patent
Dave et al.

(10) Patent No.: US 12,521,376 B2
(45) Date of Patent: *Jan. 13, 2026

(54) GEL-CHEWABLE DOSAGE FORM

(71) Applicant: Kenvue Brands LLC, Summit, NJ (US)

(72) Inventors: Vipul Dave, Hillsborough, NJ (US); Anurag Pandey, Lower Gwynedd, PA (US)

(73) Assignee: Kenvue Brands LLC, Summit, NJ (US)

( * ) Notice: Subject to any disclaimer, the term of this patent is extended or adjusted under 35 U.S.C. 154(b) by 840 days.

This patent is subject to a terminal disclaimer.

(21) Appl. No.: 17/753,648

(22) PCT Filed: Sep. 15, 2020

(86) PCT No.: PCT/IB2020/058550
§ 371 (c)(1),
(2) Date: Mar. 10, 2022

(87) PCT Pub. No.: WO2021/059082
PCT Pub. Date: Apr. 1, 2021

(65) Prior Publication Data
US 2022/0331294 A1    Oct. 20, 2022

Related U.S. Application Data

(60) Provisional application No. 62/906,839, filed on Sep. 27, 2019.

(51) Int. Cl.
*A61K 31/426* (2006.01)
*A61K 9/00* (2006.01)
(Continued)

(52) U.S. Cl.
CPC .......... *A61K 31/426* (2013.01); *A61K 9/0056* (2013.01); *A61K 9/06* (2013.01);
(Continued)

(58) Field of Classification Search
CPC ...... A61K 31/426; A61K 9/0056; A61K 9/06; A61K 31/341; A61K 31/4164;
(Continued)

(56) References Cited

U.S. PATENT DOCUMENTS 5,597,844 A * 1/1997 Chauhan .............. A61K 9/0056
514/400
11,141,375 B2 * 10/2021 Koll .................... A61K 9/0058
(Continued)

FOREIGN PATENT DOCUMENTS

| CN | 104095875 A | 10/2014 |
|---|---|---|
| CN | 104906057 A | 8/2015 |

(Continued)

OTHER PUBLICATIONS

Rassing et al, "Chewing Gum as a Drug Delivery System", *Advanced Drug Delivery Reviews* (Jan. 1, 1994) 13(1-2):89-121, Elsevier, Amsterdam, NL, (EX023861788).

(Continued)

*Primary Examiner* — Michael G. Hartley

(57) ABSTRACT

The invention relates to a gel-chewable dosage form comprising a first active pharmaceutical ingredient encapsulated in a lipid material that is embedded in the gel-chewable dosage form and wherein the gel-chewable dosage form comprises at least a second active pharmaceutical ingredient as well as a method of treating a subject suffering from a disease or disorder in the gastro intestinal tract using the gel-chewable dosage form.

14 Claims, 5 Drawing Sheets

(51) Int. Cl.
| | |
|---|---|
| A61K 9/06 | (2006.01) |
| A61K 31/341 | (2006.01) |
| A61K 31/4164 | (2006.01) |
| A61K 31/4453 | (2006.01) |
| A61K 33/00 | (2006.01) |
| A61K 33/06 | (2006.01) |
| A61K 33/08 | (2006.01) |
| A61K 33/10 | (2006.01) |
| A61K 47/14 | (2017.01) |

(52) U.S. Cl.
CPC ........ *A61K 31/341* (2013.01); *A61K 31/4164* (2013.01); *A61K 31/4453* (2013.01); *A61K 33/00* (2013.01); *A61K 33/06* (2013.01); *A61K 33/08* (2013.01); *A61K 33/10* (2013.01); *A61K 47/14* (2013.01)

(58) Field of Classification Search
CPC .... A61K 31/4453; A61K 33/00; A61K 33/06; A61K 33/08; A61K 33/10; A61K 47/14; A61K 9/1617; A61K 9/5015; A61K 9/5084; A61K 47/44; A61P 1/04
See application file for complete search history.

(56) References Cited

U.S. PATENT DOCUMENTS

| | | | |
|---|---|---|---|
| 2001/0021403 | A1* | 9/2001 | Zyck .................. A23G 4/126 426/103 |
| 2005/0181050 | A1 | 8/2005 | Hirsh et al. |
| 2014/0242214 | A1* | 8/2014 | Boghani ................. A23L 27/74 426/655 |

FOREIGN PATENT DOCUMENTS

| | | |
|---|---|---|
| CN | 104906128 A | 9/2015 |
| WO | WO 2002/017731 A | 3/2002 |
| WO | WO 2008/039052 A | 4/2008 |
| WO | WO 2017/091166 A | 6/2017 |
| WO | WO-2017091166 A1 * | 6/2017 |
| WO | WO 2018/083583 A | 5/2018 |
| WO | WO 2020/079610 A | 4/2020 |

OTHER PUBLICATIONS

Shafique et al, "Fabrication, Characterization, and In Vivo Evaluation of Famotidine Loaded solid Lipid Nanoparticles for Boosting Oral Bioavailability", *Journal of Nanomaterials* (Jan. 1, 2017) 2017:1-10 (XP055746463).

International search report and written opinion dated Nov. 12, 2020, for international application PCT/IB2020/058550.

Li et al., "In Vitro Release Characteristic of Famotidine Bioadhesive Sustained-Release Tablets", *China Pharmacy* (Dec. 31, 2008) 19(10):738-740. (English Abstract).

* cited by examiner

GEL-CHEWABLE DOSAGE FORM

CROSS-REFERENCE TO RELATED APPLICATIONS

This application is the national stage filing under 35 USC 371 of international application PCT/IB2020/058550 filed Sep. 15, 2020, which claims the benefit of U.S. provisional application 62/906,839 filed on Sep. 27, 2019, the complete disclosures of which are hereby incorporated herein by reference for all purposes.

FIELD OF INVENTION

The invention relates to a gel-chewable dosage form comprising at least a first active pharmaceutical ingredient encapsulated in a lipid material/matrix that is embedded in a gel-chewable dosage form and wherein the gel-chewable dosage form comprises at least a second active pharmaceutical ingredient, as well as a method of treating a subject suffering from a gastric disease or disorder using such a gel-chewable dosage form.

BACKGROUND OF INVENTION

Histamine H2-receptor antagonists, for example cimetidine, ranitidine, nizetidine, roxatine and famotidine, reduce acid secretion by acting directly on the acid-secreting parietal cell located within the gastric gland of the stomach wall.

Although histamine H2-receptor antagonists are remarkably effective in the treatment of many gastric disorders, in particular peptic and gastric ulcers, there exist certain patient groups which do not respond to treatment. In addition, the time lapse between dosing and onset of action limits the potential benefit of histamine H2-receptor antagonists in the treatment of acute, self-limiting gastric disorders.

Histamine H2-receptor antagonists are of potential benefit in the self-medication of acute, self-limiting gastric disorders such as hyperacidity. However, their slow onset of action is unlikely to meet the consumer requirement for rapid relief of symptoms.

Co-administration of histamine H2-receptor antagonists and other pharmaceutically active materials, including antacids, has been investigated. The rationale for co-administration with antacid is that the antacid brings about rapid relief from the symptoms of excess stomach acidity by neutralization whereas the histamine H2-receptor antagonist acts independently by inhibiting secretion of acid from the parietal cell.

Antacids used today are made from a variety of inorganic salts such as calcium carbonate, sodium bicarbonate, magnesium salts and aluminum salts. Magnesium hydroxide and aluminum hydroxide are the most potent magnesium and aluminum salts and are often used in combination. In addition, aluminum oxide, magnesium oxide, magnesium carbonate, aluminum phosphate, magaldrate, magnesium trisilicate, and aluminum sucrose sulfate (sucralfate) are also employed.

However, co-administration of famotidine is often very difficult because famotidine is extremely sensitive to humidity and alkaline conditions can immediately start to degrade in such conditions.

SUMMARY OF THE INVENTION

The invention relates to the development of new improved gel-chewable dosage form comprising a first active pharmaceutical ingredient encapsulated in a lipid material/matrix that is embedded in a gel-chewable dosage form and wherein the gel-chewable dosage form comprises at least a second active pharmaceutical ingredient. One example comprises famotidine encapsulated in a lipid material and embedded in a gel-chewable dosage form comprising at least one antacid.

The invention enables for the first time the delivery of a famotidine/antacid combination in a gel-chewable dosage form. The format ensures the stability of famotidine and offers a better sensory experience in terms of soothing and coating the painful esophageal tissues, giving consumers a faster acting remedy.

Gel-chew forms inherently have a high-water content. A high level of water can contribute to degradation (hydrolysis of famotidine) if raw famotidine is blended into the matrix. In the case of the present invention, the lipid insert/material prevents ingress of water into the famotidine particles and prevents further interaction and hydrolysis. Additionally, the gel-chew matrix of the present invention may contain an antacid component, which further interacts with famotidine and contributes to degradation.

Finally, the invention relates to a method of using the gel-chewable tablet as defined above and below in the application for the treatment of a subject suffering from a disease or disorder in the gastro intestinal tract, such as heart burn.

DETAILED DESCRIPTION OF EMBODIMENTS OF THE INVENTION

Definitions

Figure 1:
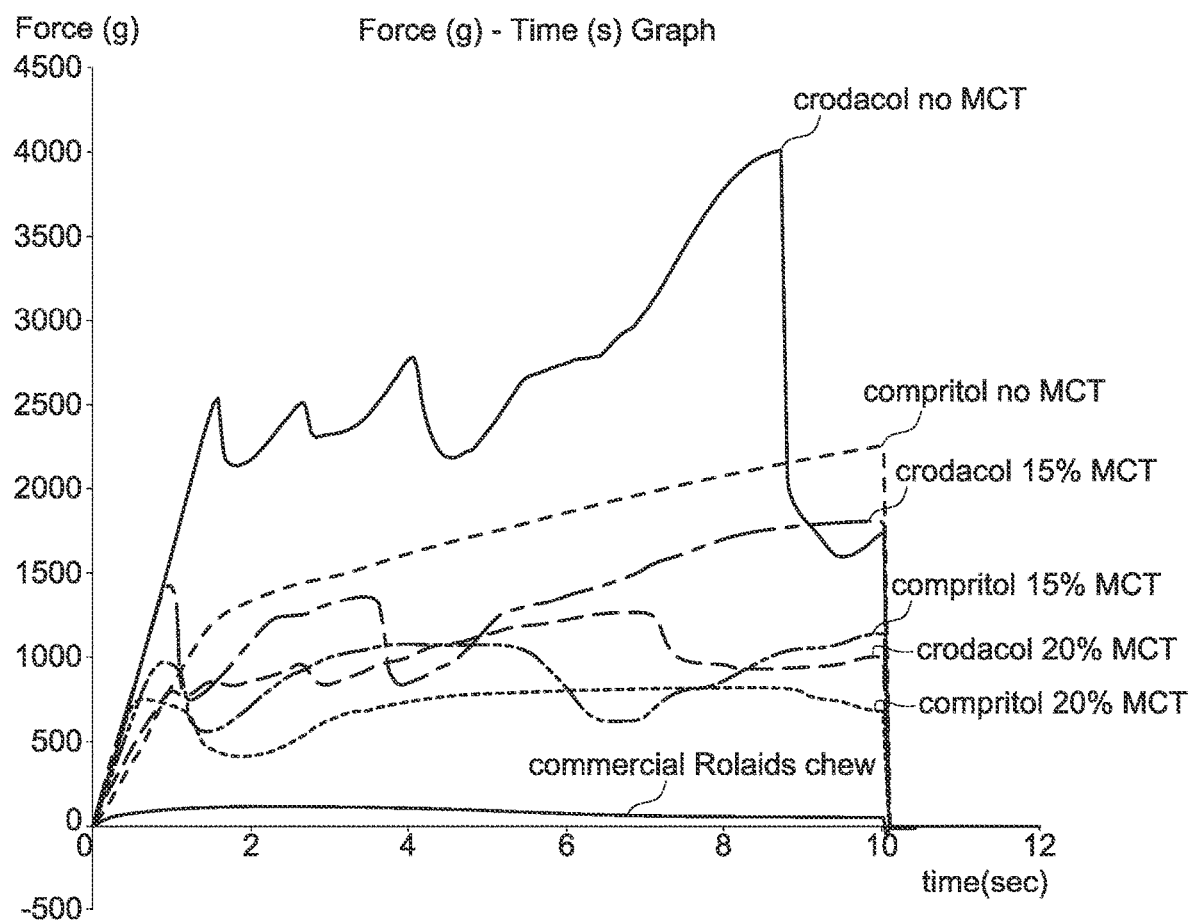
FIG. 1 shows force measurements on samples with different amounts of MCTs and the commercial Rolaids® Softchew.
Figure 2:
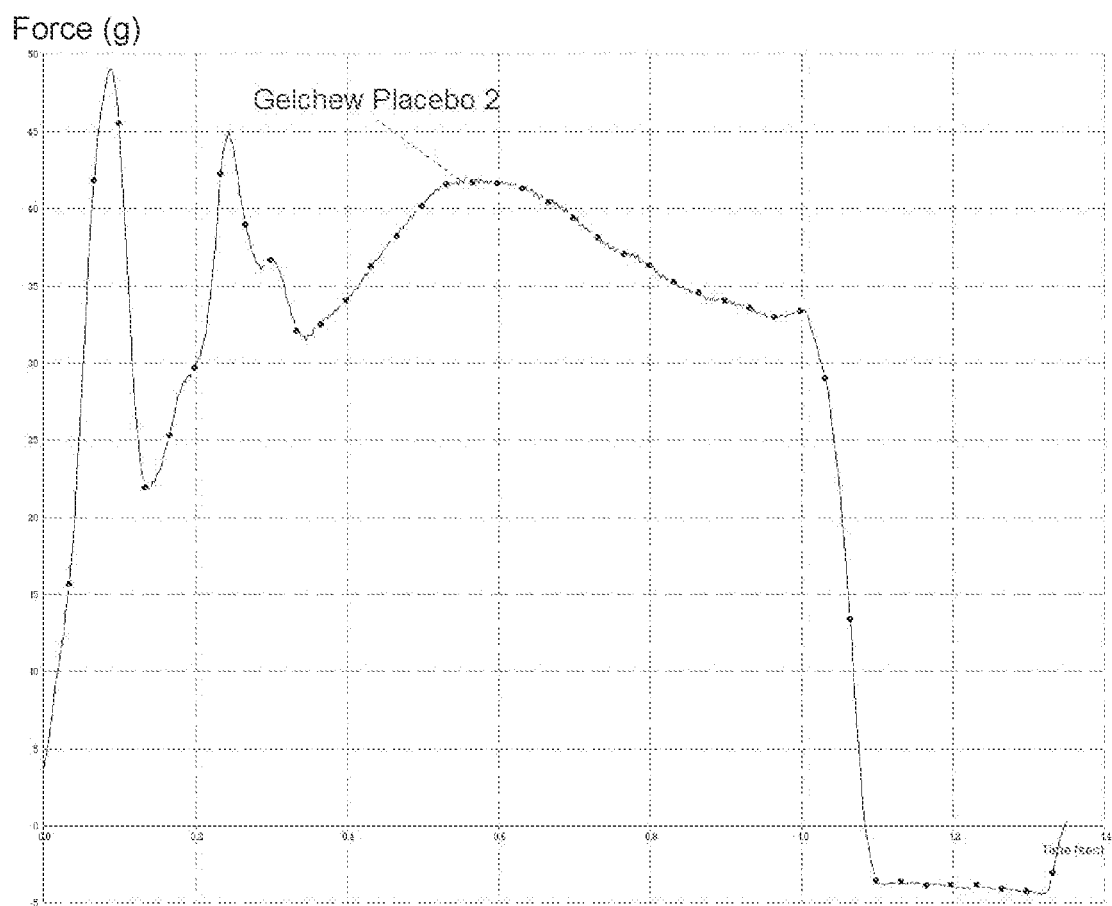
FIGS. 2-5 show force vs displacement curves of sample gel chews.
Figure 3:
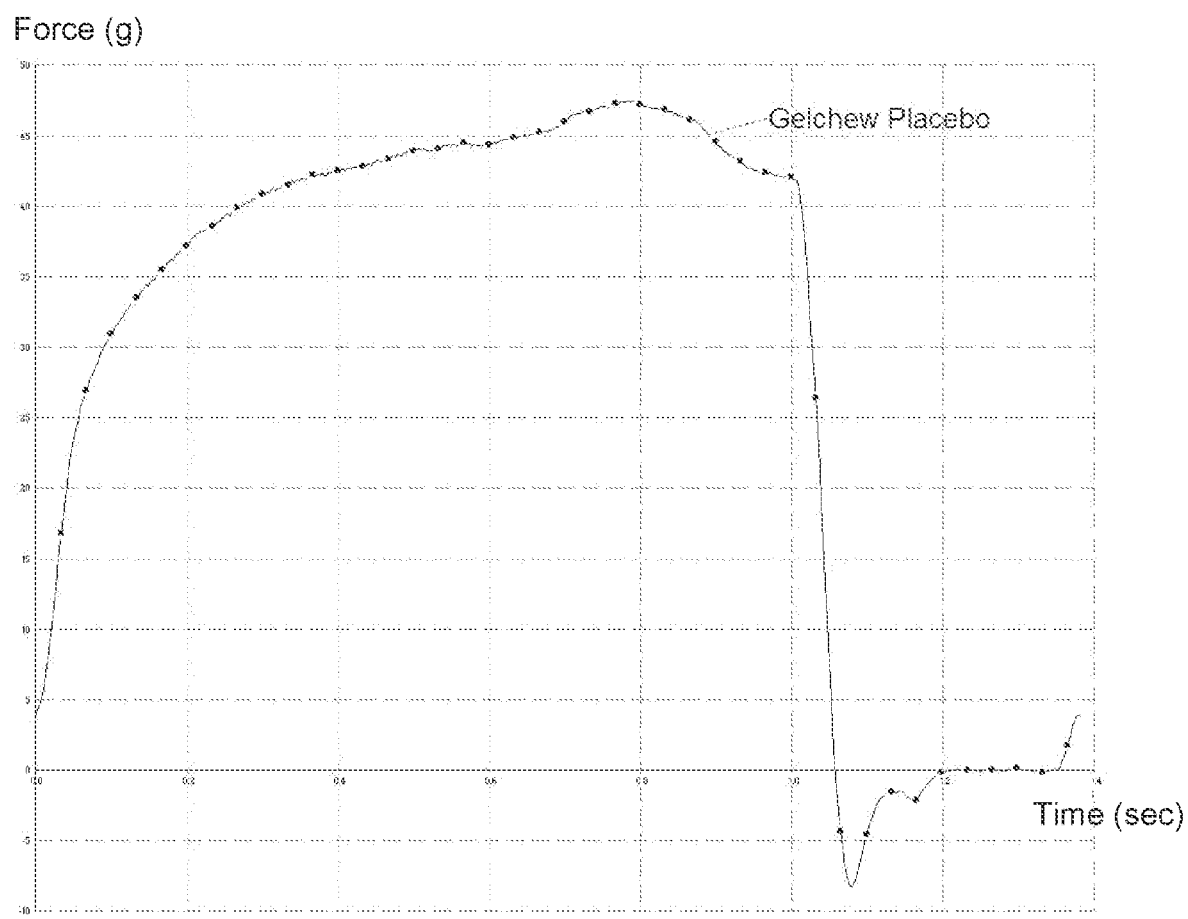
Figure 4:
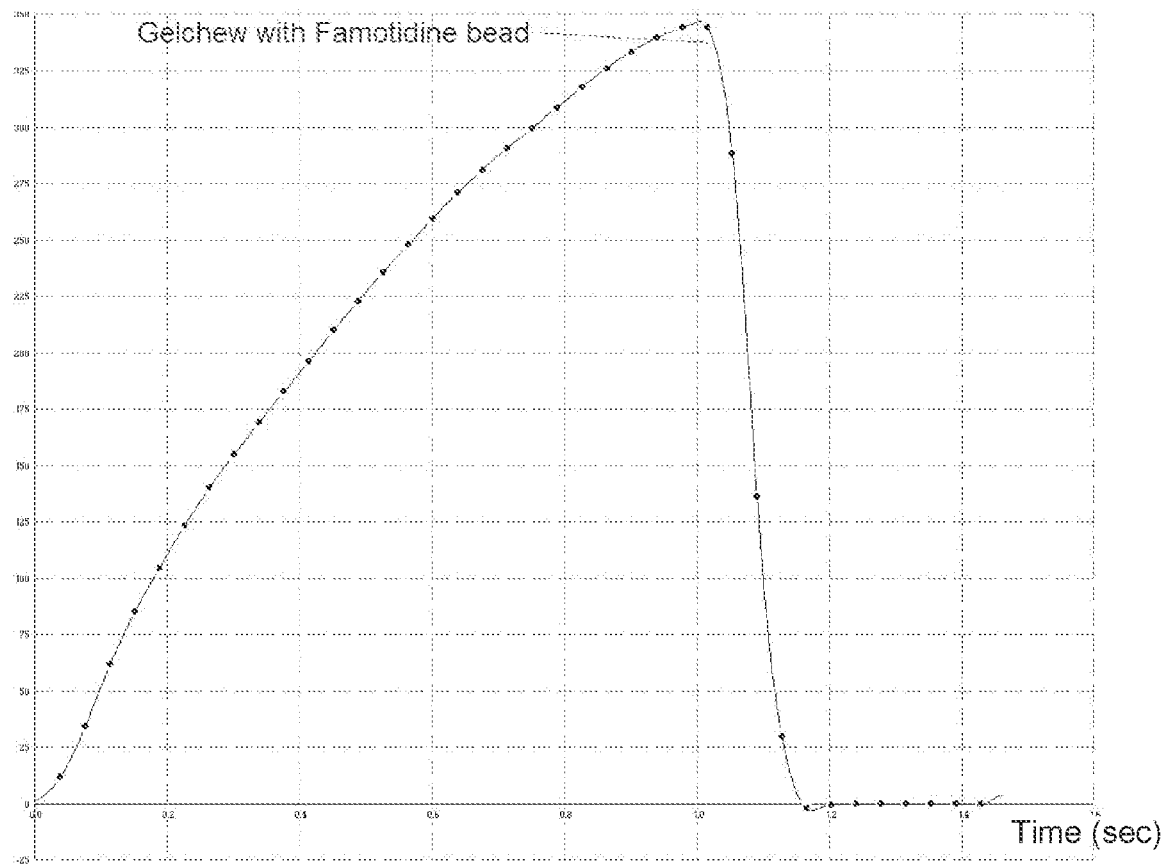
Figure 5:
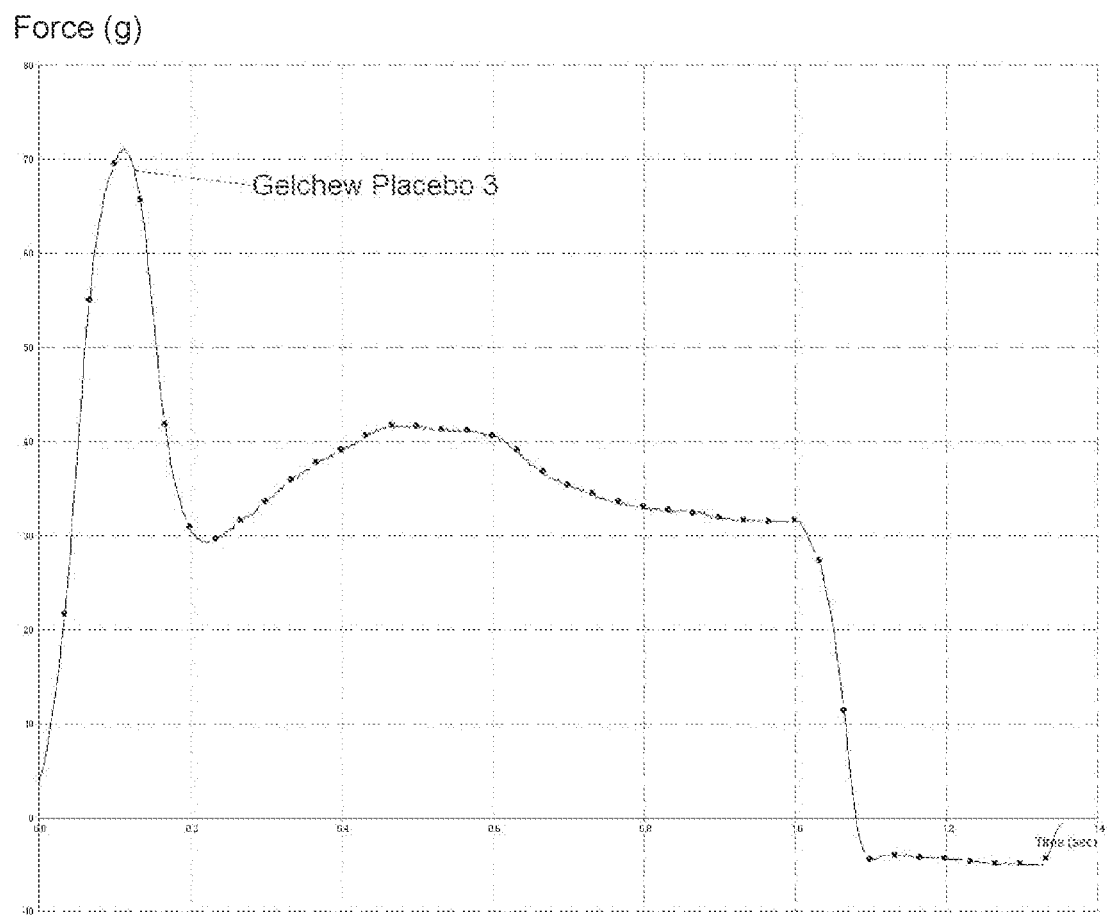

In the context of the present application and invention the following definitions apply:

The term "gel-chewable" or "gel-chew" is intended to mean a dosage form which retains its integrity and texture upon chewing, does not break into discrete, solid pieces or particulates upon chewing and is intended to be swallowed. The soft chew is palatable, edible, and is similar in texture to confectionery taffy or nougat.

The term "% w/w" is intended to mean the percentage of an ingredient(s)/the total percentage by weight of the composition (100%).

A "dosage", "dosage form", "dose unit" or "dose" as used herein means the amount of a pharmaceutical ingredient comprising therapeutically active agent(s) administered at a time. "Dosage", "dosage form", "dose unit" or "dose" includes administration of one or more units of pharmaceutical ingredient administered at the same time.

The term "gastric disease or disorder" is primarily intended to mean an increased production of the acid secretion which leads to heartburn and bothersome gas symptoms in a subject, also named indigestion. Indigestion, also known as dyspepsia, is a condition of impaired digestion. Symptoms may include upper abdominal fullness, heartburn, nausea, belching, or upper abdominal pain. People may also experience feeling full earlier than expected when eating.

Dyspepsia is a common problem and is frequently caused by gastroesophageal reflux disease (GERD) or gastritis.

The Gel-Chewable Dosage Form

In one embodiment the invention relates to a gel-chewable dosage form comprising at least a first active pharmaceutical ingredient encapsulated in a lipid material/matrix that is embedded in a gel-chewable dosage form and wherein the gel-chewable dosage form comprises at least a second active pharmaceutical ingredient.

In one example the first active pharmaceutical ingredient comprises at least one histamine H2-receptor antagonist, such as cimetidine, ranitidine, nizatidine, roxatidine and famotidine, their pharmaceutically acceptable salts, isomers and salts of isomers.

In another embodiment the H2 receptor antagonist is famotidine and the second active pharmaceutical ingredient is at least one antacid.

The particle size of the lipid encapsulated famotidine is from about 100 microns to about 5000 microns, such as from about 100 microns to about 500 microns, from about 200 microns to about 2000 microns.

The famotidine is embedded and present in the dosage form within a lipid matrix as a solid bead. The bead may be applied on the surface or inserted (as an insert) into the gel-chew dosage form. In order to prepare this bead, famotidine is suspended or dispersed in a lipid base and deposited as a bead. It may be deposited and solidified as a bead which is later applied to the gel-chew; or applied in a liquid form and deposited on the gel-chew which is solidified in-situ. The bead may be placed into a mold or die at which point the liquid gel chew composition is poured on top of the bead, and solidified in place. In this procedure the liquid gel chew composition is at a lower temperature than the temperature at which the lipid matrix may soften or melt. Upon solidification, the bead may be completely surrounded by the gel chew composition, or have a portion which is exposed to the surface.

This solidification may be facilitated by an additional cooling step at room temperature, or a temperature cooler that room temperature (25° C.). The famotidine is present in the lipid bead as a dispersed solid or in a solid solution. In one embodiment, the temperature at which the lipid matrix containing famotidine is inserted into the gel-chew formulation (as a liquid or semi-solid) is below the temperature at which the lipid material may soften or melt.

The diameter of the lipid bead of the present invention is from about 2 millimeters to about 15, or from about 3 millimeters to about 8 millimeters. The weight of the lipid bead can range from about 20 mg to about 150 mg, or from about 30 mg to about 80 mg.

In another embodiment, the famotidine is present as a plurality of particulates, wherein such particulates are coated with at least one lipid material or polymer.

The at least one antacid is selected from the group consisting of calcium carbonate, sodium bicarbonate, magnesium hydroxide, aluminum oxide, aluminum hydroxide, magnesium oxide, magnesium carbonate, aluminum phosphate, magaldrate and magnesium trisilicate or mixtures thereof. In one embodiment, the antacid is dispersed within the matrix of the gel chew.

The lipid material that encapsulates/coats the active pharmaceutical ingredient is selected from the group consisting of Cetostearyl alcohol, Glyceryl dibehenate, glyceryl palmitostearate, mono/diglycerides or hydrogenated vegetable oil or vegetable oil. Other examples of lipid materials include, but are not limited to, fatty acid esters such as sucrose fatty acid esters, mono, di, and triglycerides, glyceryl monostearate, glyceryl tristearate, glyceryl trilaurylate, glyceryl myristate, GlycoWax-932, lauroyl macrogol-32 glycerides, and stearoyl macrogol-32 glycerides; phospholipids such as phospholipids include phosphotidyl choline, phosphotidyl serene, phosphotidyl enositol, and phosphotidic acid; waxes such as carnauba wax, spermaceti wax, beeswax, candelilla wax, shellac wax, microcrystalline wax, and paraffin wax; and fats such as hydrogenated vegetable oils such as for example cocoa butter, hydrogenated palm kernel oil, hydrogenated cottonseed oil, hydrogenated sunflower oil, and hydrogenated soybean oil; and free fatty acids and their salts. These lipids are also suitable for use as the primary lipid within the lipid bead or material.

In addition the lipid material may be plasticized to match the texture of the gel-chew matrix, such as by using a plasticizer being a medium-chain triglycerides (MCT) oil ranging from about 5 to about 50% by weight of the lipid material.

In certain embodiments an emulsifier or a second lipid may be added to the primary lipid in order to soften or modify the texture of the lipid bead or material. The second lipid may also act as a plasticizer. Emulsifiers include but are not limited to polyethylene sorbitan monooleate (polysorbate 60 and 80), glycerides, glyceryl esters, glyceryl monolineoleate, and monolineoleate. Suitable second lipids for use as a plasticizer include but are not limited to medium chain triglycerides (MCTs). The emulsifier or second lipid (plasticizer) may be present within the lipid bead or material at an amount from about 5 percent to about 50 percent, or from about 5 percent to about 30 percent by weight of the lipid bead or material.

If famotidine is the first active pharmaceutical ingredient it may be in the form of granulate, bead, compressed tablet, pellets or minitablettes.

In addition to famotidine and antacid(s) the soft chewable dosage form may also comprise simethicone as a third active pharmaceutical ingredient. Simethicone may be present in the soft chew base comprising antacid, or in the lipid bead or pellet comprising famotidine.

The gelchewable tablet may further comprise one or more ingredient(s) selected from the list consisting of gelling agents, fats, proteins, colorings, flavors, sweeteners, thickeners, emulsifiers, antioxidants, preservatives, lubricants, glidants, gelling agents and disintegrants.

Example of flavors are peppermint, spearmint, *eucalyptus*, licorice, vanilla, caramel, mixed berries, mixed fruits, black current, blue berry, cherry and lemon or mixtures thereof.

If needed one or more of the active pharmaceutical ingredients are taste masked. Taste masking technologies are well known for a person skilled in the art.

In another embodiment, the gel chewable may contain a solvent such as propylene glycol, polyethylene glycol, or glycerin.

Examples of excipients include fats, proteins, fillers, glidants, lubricants, sweeteners, flavors, coloring agents, fillers, binding/gelling agents and mixtures thereof.

Suitable lubricants include long chain fatty acids and their salts, such as magnesium stearate and stearic acid, talc, glycerides waxes, and mixtures thereof.

Suitable glidants include colloidal silicon dioxide.

Suitable gelling agents may include but are not limited to pectin, starches, celluloses, derived starches, gelatin, carrageenan, alginate, and gums. Suitable gums include gellan gum, xanthan gum, guar gum, locust bean gum, tragacanth, and acacia gum. In one embodiment, more than one gelling agent is used. Preferred gelling agents include gelatin, pectin, kappa carrageenan, iota carrageenan and a combination of kappa and iota carragenan. The gelling agent may be used at a level from about 0.1 percent to about 10 percent of the weight of the gel chew dosage form.

The gel chew form may contain a residual amount of water, making it advantageous to encapsulate the famotidine in the lipid material to prevent degradation of famotidine. The amount of water may be present from about 4 percent to about 15 percent, or from about 5 percent to about 12 percent, or from about 8 percent to about 12 percent of the gel chew dosage form.

Examples of sweeteners include, synthetic or natural sugars; artificial sweeteners such as saccharin, sodium saccharin, sucralose, aspartame, acesulfame, thaumatin, glycyrrhizin, sucralose, cyclamate, dihydrochalcone, alitame, miraculin and monellin; sugar alcohols such as sorbitol, mannitol, glycerol, lactitol, maltitol, and xylitol; sugars extracted from sugar cane and sugar beet (sucrose), dextrose (also called glucose), fructose (also called laevulose), and lactose (also called milk sugar); isomalt; corn syrup, high fructose corn syrup, stevia, and mixtures thereof.

Examples of coloring agents include lakes and dyes approved as a food additive.

Examples of fillers that may be used include corn syrup, sucrose, starches, fats, proteins and gelatin. Additional materials that may be used in the soft chew base include corn syrup solids, sucrose, starches, fats, proteins and/or gelatin.

In one embodiment the dosage form is coated. The dosage form may be coated with a sugar or sugar alcohol-based coating or a film coating. Examples of materials for sugar or sugar alcohol-based coatings include but are not limited to sucrose, dextrose or xylitol. Examples of polymers for use in a film coating include but are not limited to hypromellose and polyvinyl alcohol and polyvinyl alcohol:polyethylene glycol co-polymers and mixtures thereof.

The amount of famotidine may be from about 2 to about 30 mg and the amount of the antacid(s) from about 200 to about 3000 mg. The amount of famotidine within the lipid bead portion may be from about 5 percent to about 40 percent, or from about 10 percent to about 30 percent by weight of the lipid bead portion.

The histamine H2-receptor antagonist such as famotidine may be present in an amount of from about 2 mg to about 30 mg, such as 4 mg to 20 mg or 8 mg to 12 mg or 2, 3, 4, 5, 6, 7, 8, 9, 10, 11, 12, 13, 14, 15, 16, 17, 18, 19, 20, 21, 22, 23, 24, 25, 26, 27, 28, 29 or 30 mg.

The antacid may be present in an amount of from about 200 to about 3000 mg. If two different antacids are utilized, they may be in the same amount or different amounts depending on the specific combinations. Examples are a dosage form having calcium carbonate in an amount from about 400 to about 1000 mg, such as 600, 700, 800, 900 or 1000 mg and magnesium hydroxide in an amount from about 50 to about 300 mg, such as about 100-about 200 mg, such as 100, 110, 120, 130, 140, 150, 160, 165, 170, 180, 190 or 200 mg. If aluminum oxide or aluminum hydroxide is used it may be used in an amount from about 200 to about 600 mg, such as 300, 400, 500 or 600 mg.

In another aspect the invention relates to a gel-chewable tablet, wherein the encapsulated active pharmaceutical ingredient is loperamide and the other active pharmaceutical ingredient is at least one simethicone.

It is also desirable for the lipid bead containing famotidine and the surrounding gel-chew base containing antacid to have a similar texture upon chewing. The texture can be determined through analysis of force over time. In this aspect of the invention, the force-over-time total area difference is less than 10000 g/sec between the lipid bead and the gelchew base. In other embodiments, although the force to penetrate the lipid bead is higher than the force required to penetrate the gel chew, the texture difference is not perceptible to the user when chewing and ingesting In another aspect of the invention the famotidine does not degrade over time. In this aspect the amount of total famotidine impurities in the dosage form is less than 1.5% when stored at 40° C. and 75% relative humidity for 3 months, and less than 1.0% for any single impurity when stored at 40° C. and 75% relative humidity for 3 months.

In a final aspect the invention relates to a method of treatment of a subject suffering from a gastric disease or disorder by use of the gel-chewable dosage form as defined above and a method of treatment of a subject suffering from heart burn by use of the gel-chewable dosage form as defined above.

The following examples are intended to illustrate, but not to limit, the invention in any manner, shape, or form, either explicitly or implicitly.

Example 1: Preparation of Famotidine Bead (Insert) in Meltable Edible Matrix

The famotidine hot melt solution and integrated soft chew were prepared as follows:
1. Approximately 30 g batches were prepared according to the base ratio formula in Table 1.
2. Materials in the meltable edible matrix were melted in a stainless-steel vessel at approximately 70° C. Famotidine was dispersed in the molten material and was continuously mixed to maintain uniform distribution.
3. A pipette was used to transport measured amount of molten mixture to form beads which then solidified upon cooling.
4. Variations in separate materials within the Base formula are shown in Table 2.

TABLE 1

Base Famotidine Bead Edible Matrix Formula

| Ingredient | mg/Bead | % W/W |
|---|---|---|
| Meltable Edible Matrix* | 56.7 | 85.00 |
| Famotidine (Fine Powder) | 10.0 | 15.00 |
| TOTAL | 66.7 | 100.00 |

*Lipophilic thermoplastic material which in some examples also contains a plasticizer to soften the material. Preferred plasticizers include medium chain monoglycerides, diclycerides and triglycerides.

TABLE 2

Initial Ingredients for Famotidine Containing Beads

| Ingredient | mg/Tab | % w/w |
|---|---|---|
| FORMULA 1 | | |
| SP Crodacol CS50[1] (Cetostearyl alcohol) | 56.67 | 85.00 |
| Famotidine | 10.00 | 15.00 |
| | 66.67 | 100.00 |
| FORMULA 2 | | |
| Compritol 888 ATO[2] (Glyceryl dibehenate) | 56.67 | 85.00 |
| Famotidine | 10.00 | 15.00 |
| | 66.67 | 100.00 |

TABLE 2-continued

Initial Ingredients for Famotidine Containing Beads

| Ingredient | mg/Tab | % w/w |
|---|---|---|
| FORMULA 3 | | |
| Geleol[3] (mono/diglycerides, NF) | 56.67 | 85.00 |
| Famotidine | 10.00 | 15.00 |
|  | 66.67 | 100.00 |
| FORMULA 4 | | |
| Sterotex (Hydrogenated cottonseed oil, NF) | 56.67 | 85.00 |
| Famotidine | 10.00 | 15.00 |
|  | 66.67 | 100.00 |
| FORMULA 5 | | |
| SP Crodacol CS50[1] (Cetostearyl alcohol) | 43.34 | 65.00 |
| Gelucire[4] 50/13 (Stearoyl polyoxyl-32 Glycerides) | 13.33 | 20.00 |
| Famotidine | 10.00 | 15.00 |
|  | 66.67 | 100.00 |
| FORMULA 6 | | |
| Compritol 888 ATO (Glyceryl dibehenate) | 43.34 | 65.00 |
| Gelucire 50/13 (Stearoyl polyoxyl-32 Glycerides) | 13.33 | 20.00 |
| Famotidine | 10.00 | 15.00 |
|  | 66.67 | 100.00 |

[1]Commercially available from the Croda Corporation
[2]Commercially available from the Gattefosse Corporation
[3]Commercially available from the Gattefosse Corporation
[4]Commercially available from the Gattefosse Corporation Example 2: Preparation of Famotidine Particulates Part A: Preparation of Famotidine Granulation:

TABLE 3

Granulation ingredients for Famotidine Particles (1.5 kg batch)

|  | % (w/w) | Grams for 1.5 kg batch |
|---|---|---|
| Lactose Monohydrate, Impalpable NF | 81.00 | 1215 |
| Famotidine USP | 13.00 | 195 |
| Hypromellulose E5 Premium USP | 6.00 | 90 |
| Purified Water USP | xxx | 810* |

*water removed upon drying of granulation

1. Lactose Monohydrate and Famotidine were passed through 40 mesh screen.
2. Approximately ⅔ of total water was heated to 70-80° C. The polymer was slowly added to water while mixing. using a high shear mixer. Remaining water was added. The solution was cooled and allow to de-aerate.
3. Granulation was carried out in a Huttlin Diskjet unit by spraying the granulating fluid at 50 cc/min. After granulation was completed, the particles were dried and discharged for hot melt coating.
4. After granulation, pass material through 18 mesh before hot melt coating.

Part B: Hot Melt Coating

For hot melt coating, Precirol is heated to a temperature of about 60° C. and sprayed on Famotidine granulation from Part A. The particles were coated with 30% weight gain.

Example 3: Stability Evaluation

The beads from Example 1 (Formulas 1-6) were exposed to different conditions in amber glass jars to determine the stability of Famotidine. The famotidine and famotidine impurity assay were analyzed versus a stock standard famotidine solution prepared at 400 μg/mL, using an HPLC with the following parameters:

Column Advanced Chromatography Technologies (ACE) C8, 3 μm
(150 mm×4.6 mm I.D.), ACE-112-1546
Mobile Phase: Gradient method of Sodium Phosphate Buffer:ACN (98:2 v/v to 30:70 over 26 minutes)
Flow rate: 1.0 mL/min
Injection volume: 15 L
UV Detector at 278 nm Sample preparation included the following steps:
For samples containing glyceryldibehenate (Compritol): 50 mL chloroform was added and swirled until dissolved. Diluted to volume, with chloroform and mixed well.
For samples containing cetostearyl alcohol (Crodacol): 50 mL methanol was added and mixed using mechanical shaker until dissolved. Diluted to volume, with methanol and mixed well.

Part A: Storage in Amber Glass Jars:

Table 4 summarizes the stability study results.

TABLE 4

Stability Study Results - Beads Stored in Amber Glass Jars

| Sample | Condition | Assay | FAM-A1[a] | FAM-A3[b] | FAM-A6[c] | FAM-UDP[d] | FAM-UDP2[d] |
|---|---|---|---|---|---|---|---|
| Formula 1 | 2 Weeks, RT | 104.3 | Not detected | 0.125 | Not detected | 0.145 | Not detected |
| Formula 2 | 2 Weeks, RT | 101.9 | Not detected | 0.124 | Not detected | 0.141 | Not detected |
| Formula 3 | 2 Weeks, RT | 104.3 | Not detected | 0.123 | Not detected | 0.149 | Not detected |
| Formula 4 | 2 Weeks, RT | 103.8 | Not detected | 0.119 | 0.144 | 0.136 | Not detected |
| Formula 5 | 2 Weeks, RT |  | Not detected |  |  |  |  |
| Formula 6 | 2 Weeks, RT |  | Not detected |  |  |  |  |
| Formula 1 | 2 Weeks, 40° C./75% RH | 103.2 | Not detected | 0.122 | Not detected | 0.140 | Not detected |
| Formula 2 | 2 Weeks, 40° C./75% RH | 100.6 | Not detected | 0.124 | Not detected | 0.158 | Not detected |

TABLE 4-continued

Stability Study Results - Beads Stored in Amber Glass Jars

| Sample | Condition | Assay | FAM-A1[a] | FAM-A3[b] | FAM-A6[c] | FAM-UDP[d] | FAM-UDP2[d] |
|---|---|---|---|---|---|---|---|
| Formula 3 | 2 Weeks, 40° C./75% RH | 102.6 | Not detected | 0.123 | 0.17 | 0.169 | Not detected |
| Formula 4 | 2 Weeks, 40° C./75% RH | 103.4 | Not detected | 0.123 | Not detected | 0.141 | Not detected |
| Formula 5 | 2 Weeks, 40° C./75% RH | | Not detected | | | | |
| Formula 6 | 2 Weeks, 40° C./75% RH | | Not detected | | | | |
| Formula 1 | 3 Months, RT | 130.3 | Not detected | 0.158 | 0.1 | 0.128 | Not detected |
| Formula 2 | 3 Months, RT | 121.2 | Not detected | 0.142 | 0.127 | 0.122 | Not detected |
| Formula 3 | 3 Months, RT | 120.3 | Not detected | 0.139 | 0.125 | 0.125 | Not detected |
| Formula 4 | 3 Months, RT | 123.4 | Not detected | 0.145 | 0.122 | 0.124 | Not detected |
| Formula 5 | 3 Months, RT | 100.0 | Not detected | 0.115 | | 0.096 | Not detected |
| Formula 6 | 3 Months, RT | 94.8 | 0.102 | 0.110 | 0.107 | 0.118 | Not detected |
| Formula 1 | 3 Months, 40° C./75% RH | 123.4 | Not detected | 0.151 | 0.095 | 0.121 | Not detected |
| Formula 2 | 3 Months, 40° C./75% RH | 126.5 | Not detected | 0.161 | 0.107 | 0.219 | Not detected |
| Formula 3 | 3 Months, 40° C./75% RH | 112.1 | Not detected | 0.152 | 0.107 | 0.605 | 0.731 |
| Formula 4 | 3 Months, 40° C./75% RH | 124.9 | Not detected | 0.156 | 0.131 | 0.125 | Not detected |
| Formula 5 | 3 Months, 40° C./75% RH | 94.8 | Not detected | 0.112 | Not detected | 0.091 | Not detected |
| Formula 6 | 3 Months, 40° C./75% RH | 99.0 | Not detected | 0.118 | Not detected | 0.277 | Not detected |

[a]FAM-A1: Famotidine Impurity A1
[b]FAM-A3: Famotidine Impurity A3
[c]FAM-A6: Famotidine Impurity A6
[d]FAM UDP: Famotidine Unspecified Degradation Product
RT - Room Temperature
RH - Relative Humidity Part B: Open Dish Storage Formulas 1 and 2 from Example 1 were selected for Open Dish Stability evaluation. The samples were placed into an open dish and placed into the respective stability environment.

Table 5 summarizes the stability results of Famotidine in the beads during an Open Dish Study at 40° C./75% RH (relative humidity) for 3 months. Minimum degradation of Famotidine was observed after 3 months.

TABLE 5

Stability Study Results - Open Dish Stability

| Sample | Condition | Assay | FAM-A1 | FAM-A3 | FAM-A6 | FAM-UDP | FAM-UDP2 |
|---|---|---|---|---|---|---|---|
| Formula 1 | Initial | 100.4 | Not detected | 0.119 | Not detected | 0.107 | Not detected |
| Formula 2 | Initial | 126.1 | Not detected | 0.148 | Not detected | 0.135 | Not detected |
| Formula 1 | 2 Weeks, 40° C./75% RH | 98.6 | Not detected | 0.117 | Not detected | 0.094 | Not detected |
| Formula 2 | 2 Weeks, 40° C./75% RH | 120.0 | Not detected | 0.146 | Not detected | 0.126 | Not detected |
| Formula 1 | 4 Weeks, 40° C./75% RH | 100.2 | Not detected | 0.133 | Not detected | 0.112 | Not detected |
| Formula 2 | 4 Weeks, 40° C./75% RH | 115.8 | Not detected | 0.151 | Not detected | 0.133 | Not detected |
| Formula 1 | 3 Months, 40° C./75% RH | 101.7 | Not detected | 0.157 | Not detected | Not detected | 0.12 |
| Formula 2 | 3 Months, 40° C./75% RH | 123.4 | 0.102 | 0.181 | Not detected | Not detected | 0.15 |

Example 4: Samples with Various Levels of Medium Chain Triglycerides (MCTs) & Force Measurement Part A: Analysis of Bead Formulations In order to soften the beads so that the texture is similar to the soft chew, different levels of MCT were added to Crodacol and Compritol as shown in Table 6, with associated force measurements.

Force Measurements were analyzed to more closely match the organoleptic texture between a get chew ingredient and the bead. Hardness was measured using a Texture Profile Analyzer with the following test parameters:

Material Thickness—Solid block approx. 20 mm
Probe—Replaceable needle probe
Load cell—5 Kg
Test Profile—2 mm penetration @ 0.2 mm/sec Results: Blends containing 30% MCT oil had the lowest hardness values (not included in graph). For stability studies, 15% MCT oil was selected to minimize leaching of the oil from the bead into the gel chew matrix.

TABLE 6

Samples with Various levels of MCTs

| All contain 15% Famotidine | Formula | Force measurement Area F-T 1:2 (g · sec) |
|---|---|---|
| Crodacol without MCT | Formula 7 | 24,217.775 |
| Compritol without MCT | Formula 8 | 16,318.691 |
| Crodacol 15% MCT | Formula 9 | 13,159.655 |
| Compritol 15% MCT | Formula 10 | 8,805.754 |
| Crodacol 20% MCT | Formula 11 | 9,599.951 |
| Compritol 20% MCT | Formula 12 | 7,040.707 |
| Crodacol 30% MCT | Formula 13 | 8713.572 |
| Compritol 30% MCT | Formula 14 | 4254.296 |

Results: Blends containing 30% MCT oil had the lowest hardness values (not included in graph). For stability studies, 15% MCT oil was selected to minimize leaching of the oil from the bead into the gel chew matrix.

FIG. 1 shows force measurements on samples with different amounts of MCTs and the commercial Rolaids® Softchew.

Part B: Analysis of Gel Chew Formulations

Texture Analysis:

Testing of the gel chew matrix as a placebo and the gel chew containing the famotidine bead (as in Example 4) was carried out using a TA XT plus texture analyzer equipped with a 5000 g load cell. All testing was carried out under compression mode. A 1 mm cylindrical probe was used for analysis. Following test conditions were used:

Test Mode: Compression
Pre-Test Speed: 1.0 mm/sec
Test Speed: 2.0 mm/sec
Post Test Speed: 10.0 mm/sec
Total Distance: 14 mm
Trigger Type: Force
Trigger Force: 1.0 g Briefly, a sample of gel chew was placed on the testing platform and tested in compression mode using a 1 mm cylindrical probe. The probe speed was set at 2.0 mm/sec and the load was monitored as the probe penetrated the sample. A force vs displacement curve was plotted for each sample as shown in FIGS. 2-5.

Example 5: Preparation of Gel-Chew with Famotidine Containing Bead

TABLE 7

Gel Chew Formula containing Bead

|  | % (w/w) | Mg/Dosage Form | Grams for 1.0 kg batch |
|---|---|---|---|
| Glycerin | 50.00 | 2500.0 | 500 |
| Propylene Glycol | 1.50 | 75.0 | 15.0 |
| Calcium Carbonate | 15.0 | 750.0 | 150.0 |
| 63 Dextrose Equivalent Corn Syrup | 9.00 | 450.0 | 90.0 |
| Gelatin | 9.50 | 475.0 | 95.0 |
| Pectin | 0.25 | 12.5 | 25.0 |
| Sucralose | 0.05 | 2.50 | 0.50 |
| Modified Starch | 1.50 | 75.0 | 15.0 |
| Flavor | 0.10 | 5.0 | 1.00 |
| Color | 0.30 | 15.0 | 3.00 |
| Famotidine Bead* | 1.33 | 66.67 | * |
| Purified Water USP | 11.5 | 573.3 | 115.0 |
| TOTAL | 100.0 | 5000.0 |  |

*Added separately, individually into each Gel Chew at the end of processing

The formulation in Example 5 is prepared using the following procedure:

1. The glycerin and propylene glycol are added to a suitable sized vessel. The calcium carbonate is dispersed using an overhead mixer, and heated to 40-50° C.
2. The corn syrup and purified water was added to the mixture from Step 1 and heated to 60-70° C.
3. The gelatin, pectin, sucralose, flavor, modified starch and color are added to the mixture using the overhead mixer and mixed until blended.
4. The bead is added to a silicon mold, and the liquid mixture containing the calcium carbonate is poured over the bead until a 5 g dosage form is achieved. The mixture is cooled to room temperature (approximately 25° C.) until a gel chew is formed.

Example 6: Preparation of Gel-Chew with Famotidine Particulates

TABLE 8

Gel Chew formula containing particulates

|  | % (w/w) | Mg/Dosage Form | Grams for 1.0 kg batch |
|---|---|---|---|
| Glycerin | 48.13 | 2406.5 | 481.3 |
| Propylene Glycol | 1.50 | 75.0 | 15.0 |
| Calcium Carbonate | 15.0 | 750.0 | 150.0 |
| 63 Dextrose Equivalent Corn Syrup | 9.49 | 474.5 | 94.9 |
| Gelatin | 9.40 | 470.0 | 94.0 |
| Pectin | 0.25 | 12.5 | 25.0 |
| Sucralose | 0.05 | 2.50 | 0.50 |
| Modified Starch | 1.50 | 75.0 | 15.0 |
| Flavor | 0.10 | 5.0 | 1.00 |
| Color | 0.30 | 15.0 | 3.00 |

TABLE 8-continued

Gel Chew formula containing particulates

| | % (w/w) | Mg/Dosage Form | Grams for 1.0 kg batch |
|---|---|---|---|
| Famotidine Coated Particulates* | 3.08 | 154.0 | 30.8 |
| Purified Water USP | 11.2 | 560.0 | 112.0 |
| TOTAL | 100.0 | 5000.0 | 1000.0 |

*Equivalent to 10 mg famotidine, from EXAMPLE 2

The formulation in Example 6 is prepared using the following procedure

1. The glycerin and propylene glycol are added to a suitable sized vessel. The calcium carbonate is dispersed using an overhead mixer, and heated to 40-50° C.
2. The corn syrup and purified water was added to the mixture from Step 1 and heated to 60-70° C.
3. The gelatin, pectin, sucralose, flavor, modified starch and color are added to the mixture using the overhead mixer and mixed until blended, and cooled to 45-50° C.
4. The famotidine coated particulates are added to the mixture in Step 3 and mixed.
5. 5 g of the liquid mixture containing the calcium carbonate and famotidine is poured into individual silicone molds. The mixture is cooled to room temperature (approximately 25° C.) until a gel chew is formed.

TABLE 9

Additional Famotidine Containing Bead Formulations

| Ingredient | mg/Tab | % W/W |
|---|---|---|
| FORMULA 15 | | |
| Compritol 888 ATO (Glyceryl dibehenate) | 46.7 | 70.00 |
| Labrafac Lipophile WL 1349 (MCT oil)* | 10.0 | 15.00 |
| Famotidine | 10.0 | 15.00 |
| | 66.7 | 100.00 |
| FORMULA 16 | | |
| SP Crodacol CS50 (Cetostearyl alcohol) | 46.7 | 70.00 |
| Labrafac Lipophile WL 1349 (MCT oil)* | 10.0 | 15.00 |
| Famotidine | 10.0 | 15.00 |
| | 66.7 | 100.00 |

*MCT Oil was added to soften the bead matrix

The invention claimed is:

1. A gel-chewable dosage form comprising:
a gelling agent at a level of from 0.1 percent to 10 percent of the weight of the gel-chewable dosage form, wherein the gelling agent is selected from the group consisting of gelatin, pectin, kappa carrageenan, iota carrageenan and a combination of kappa and iota carrageenan;
a first active pharmaceutical ingredient encapsulated in a lipid material/matrix, the first active pharmaceutical ingredient comprises at least one histamine H2 receptor antagonist, and the H2 receptor antagonist is famotidine,
wherein the lipid encapsulated active pharmaceutical ingredient is embedded in the gel chewable dosage form and
wherein the lipid material/matrix comprises a first lipid and a second lipid and the first lipid is plasticized with a plasticizer to match the texture of the gel-chewable matrix, wherein a difference in texture between the lipid material/matrix and the gel chewable dosage form as determined through analysis of force over time has a force-over-time total area difference of less than 10000 g/sec,
wherein the second lipid is a plasticizer and is medium-chain triglycerides (MCT) oil ranging from about 5 to about 50% by weight of the total amount of lipid material in the lipid material/matrix, and
wherein the gel-chewable dosage form comprises at least a second active pharmaceutical ingredient.

2. The gel-chewable dosage form according to claim 1, wherein the H2 receptor antagonist is famotidine and the second active pharmaceutical ingredient is at least one antacid.

3. The gel-chewable dosage form according to claim 2, wherein the famotidine is liquid encapsulated famotidine, and wherein the particle size of the lipid encapsulated famotidine is from about 100 microns to about 5000 microns.

4. The gel-chewable dosage form according to claim 2, wherein the at least one antacid is selected from the group consisting of calcium carbonate, sodium bicarbonate, magnesium hydroxide, aluminum hydroxide, aluminum oxide, magnesium oxide, magnesium carbonate, aluminum phosphate, magaldrate and magnesium trisilicate or mixtures thereof.

5. The gel-chewable dosage form according to claim 1, wherein the first lipid material is selected from the group consisting of Cetostearyl alcohol, Glyceryl dibehenate, mono/diglycerides, hydrogenated vegetable oil and vegetable oil or mixtures thereof.

6. The gel-chewable dosage form according to claim 2, wherein the famotidine is a granulate, bead or compressed tablet, pellets or minitablettes.

7. The gel-chewable dosage form according to claim 1, further comprising a third active pharmaceutical ingredient, wherein the third active pharmaceutical ingredient comprises simethicone.

8. The gel-chewable dosage form according to claim 1, further comprising at least one ingredient selected from the list consisting of a color, a flavor, a sweetener, a thickener, an emulsifier, an antioxidant, a preservative, a gelling agent and a disintegrant.

9. The gel-chewable dosage form according to claim 8, wherein the flavor is selected from the group consisting of peppermint, spearmint, eucalyptus, licorice, vanilla, caramel, mixed berries, mixed fruits, black current, blue berry, cherry and lemon or mixtures thereof.

10. The gel-chewable dosage form according to claim 1, wherein at least one of the first active pharmaceutical ingredient and the second active pharmaceutical ingredient is taste masked.

11. The gel-chewable dosage form according to claim 2, wherein the famotidine is present in an amount of from about 2 to about 30 mg.

12. The gel-chewable dosage form according to claim 2, wherein the antacid is present in an amount of from about 200 to about 3000 mg.

13. A method of treatment of a subject suffering from a gastric disease or disorder by use of the gel-chewable dosage form according to claim 1.

14. A method of treatment of a subject suffering from heart burn by use of the gel-chewable dosage form according to claim 1.

\* \* \* \* \*